US012688409B2

(12) United States Patent
Mitra et al.

(10) Patent No.: US 12,688,409 B2
(45) Date of Patent: Jul. 21, 2026

(54) OPTIMIZING SEND TIME FOR ELECTRONIC COMMUNICATIONS

(71) Applicant: ADOBE INC., San Jose, CA (US)

(72) Inventors: Saayan Mitra, San Jose, CA (US);
Xiang Chen, Palo Alto, CA (US);
Akangsha Sunil Bedmutha, San Mateo, CA (US); Viswanathan Swaminathan, Saratogaa, CA (US);
Omar Rahman, San Jose, CA (US);
Camille Girabawe, Nashville, TN (US)

(73) Assignee: Adobe Inc., San Jose, CA (US)

( * ) Notice: Subject to any disclaimer, the term of this patent is extended or adjusted under 35 U.S.C. 154(b) by 1229 days.

(21) Appl. No.: 17/164,111

(22) Filed: Feb. 1, 2021

(65) Prior Publication Data

US 2022/0245446 A1      Aug. 4, 2022

(51) Int. Cl.
*G06N 3/08*        (2023.01)
*G06N 3/04*        (2023.01)
(52) U.S. Cl.
CPC ................. *G06N 3/08* (2013.01); *G06N 3/04* (2013.01)
(58) Field of Classification Search
CPC ............. G06N 3/08; G06N 3/04; G06N 3/045
See application file for complete search history.

(56) References Cited

U.S. PATENT DOCUMENTS

| | | | |
|---|---|---|---|
| 2007/0156514 A1* | 7/2007 | Wright | G06Q 30/0242 705/14.55 |
| 2007/0156621 A1* | 7/2007 | Wright | G06Q 30/02 706/48 |
| 2007/0156887 A1* | 7/2007 | Wright | G06Q 30/02 709/224 |
| 2016/0148077 A1* | 5/2016 | Cox | G06F 18/2413 382/159 |
| 2018/0032888 A1* | 2/2018 | Modarresi | G06N 20/00 |
| 2019/0213476 A1* | 7/2019 | Singh | G06N 3/044 |
| 2020/0137008 A1* | 4/2020 | Jin | H04L 51/214 |
| 2020/0327419 A1* | 10/2020 | Zhang | G06N 20/00 |

OTHER PUBLICATIONS

Dusa, How do I get the weighted sum of multiple losses & accuracy (caffe), 2017, Stackoverflow, pp. 1-2 (Year: 2017) https://stackoverflow.com/questions/43096599/how-do-i-get-the-weighted-sum-of-multiple-losses-accuracy-caffe.*

(Continued)

*Primary Examiner* — Matthew Ell
*Assistant Examiner* — Humaira Zahin Mauni
(74) *Attorney, Agent, or Firm* — Shook, Hardy & Bacon L.L.P.

(57)        ABSTRACT

An improved electronic communication system schedules transmission of electronic communications based on a predicted open time and click time. The open and click times are predicted from a machine learning model that is trained to optimize for both tasks. Additionally, when training the machine learning model, the loss used for adjusting the system to achieve a desired accuracy may be a biased loss determined from a function that penalizes overpredicting the open time. As such, the loss value may be determined by different set of rules depending on whether the predicted time is greater than the actual time or not.

20 Claims, 7 Drawing Sheets

500

502 → RECEIVE INDICATION OF INTENDED RECIPIENT OF AN ELECTRONIC COMMUNICATION

504 → UTILIZE A MACHINE LEARNING MODEL TO DETERMINE A PREDICTED OPEN TIME AND A PREDICTED CLICK TIME FOR THE ELECTRONIC COMMUNICATION BASED ON RECIPIENT DATA FOR THE INTENDED RECIPIENT

506 → BASED ON AT LEAST THE PREDICTED OPEN TIME AND THE PREDICTED CLICK TIME, DETERMINE A SEND TIME FOR THE ELECTRONIC COMMUNICATION

508 → BASED ON THE SEND TIME, GENERATE A SCHEDULE FOR TRANSMITTING THE ELECTRONIC COMMUNICATION TO THE INTENDED RECIPIENT

(56)　　　　　　　References Cited

OTHER PUBLICATIONS

Bonfrer, Andre, and Xavier Dreze. "Real-time evaluation of e-mail campaign performance." Marketing Science 28.2 (2009): 251-263. (Year: 2009).*

Yang, Hong, et al. "A multi-task learning model for daily activity forecast in smart home." Sensors 20.7 (2020): 1933. (Year: 2020).*

Khim, D. L., Davies, C. (Dec. 1, 2015). 2015 Report: The Best Times To Get Your Business Email Opened. Hubspot. 20 pages.

Cox, J. (Sep. 8, 2017). Best Time to Send an Email: User Data Study by Industry. SendinBlue. Retrieved Oct. 21, 2020 from the Internet at <https://www.sendinblue.com/blog/best-time-to-send-email/>. 13 pages.

Rendle, S. (Dec. 2010). Factorization machines. In 2010 IEEE International Conference on Data Mining (pp. 995-1000). IEEE.

* cited by examiner

210

200

SEND TIME OPTIMIZER

212 — RECEIVING COMPONENT

214 — MULTI-TASK PREDICTOR

216 — SEND TIME DETERMINER

218 — SCHEDULER

202

DATA STORE

300

SEND TIME OPTIMIZATION SYSTEM

320 — TRAINING ENGINE

322 — TASK PREDICTOR

324 — LOSS DETERMINER

326 — ADJUSTMENT COMPONENT

SEND TIME OPTIMIZER

310

330

NEURAL NETWORK SYSTEM — 334

TRAINING DATA — 332

500

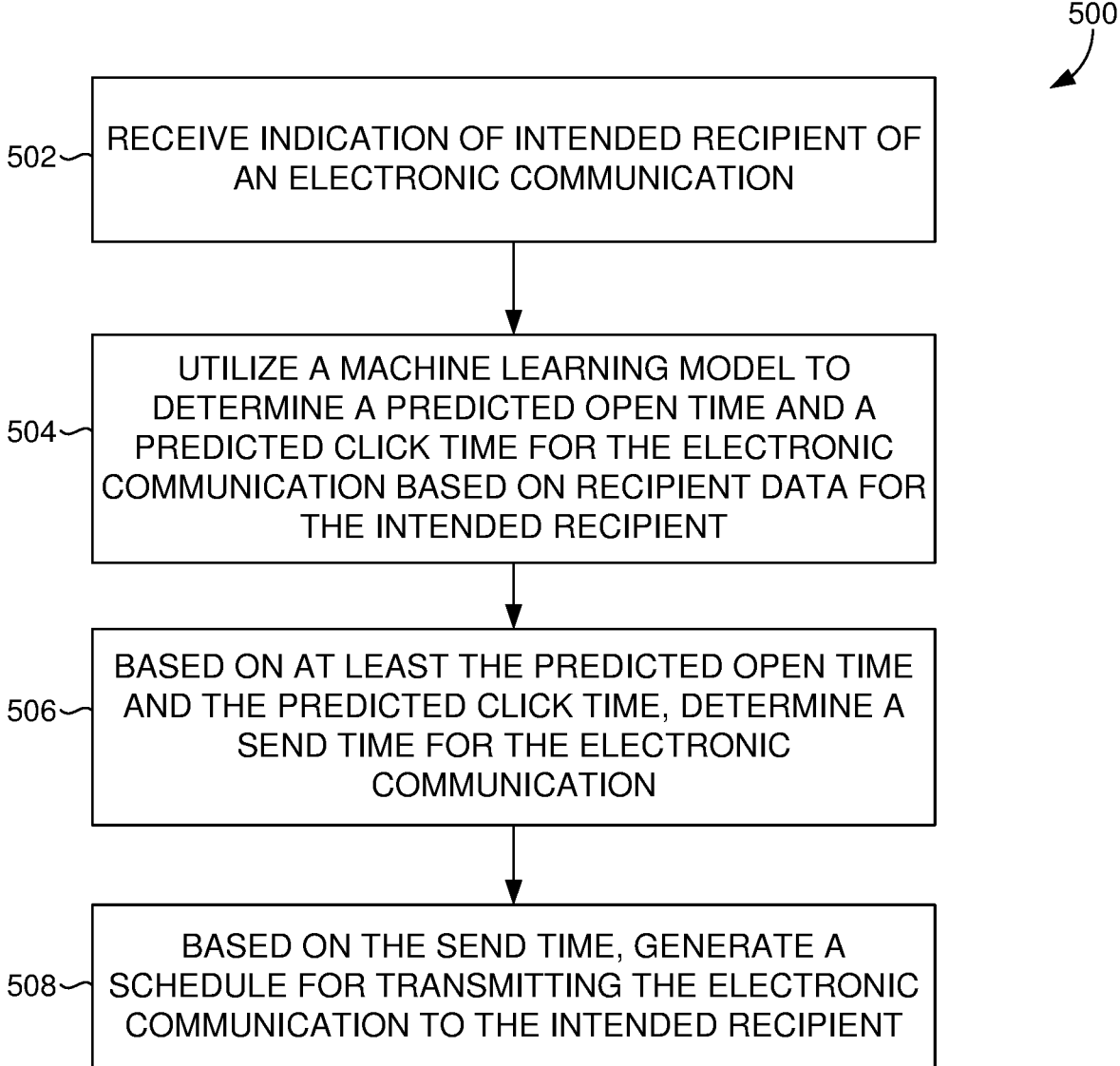

502 — RECEIVE INDICATION OF INTENDED RECIPIENT OF AN ELECTRONIC COMMUNICATION

504 — UTILIZE A MACHINE LEARNING MODEL TO DETERMINE A PREDICTED OPEN TIME AND A PREDICTED CLICK TIME FOR THE ELECTRONIC COMMUNICATION BASED ON RECIPIENT DATA FOR THE INTENDED RECIPIENT

506 — BASED ON AT LEAST THE PREDICTED OPEN TIME AND THE PREDICTED CLICK TIME, DETERMINE A SEND TIME FOR THE ELECTRONIC COMMUNICATION

508 — BASED ON THE SEND TIME, GENERATE A SCHEDULE FOR TRANSMITTING THE ELECTRONIC COMMUNICATION TO THE INTENDED RECIPIENT

FIG. 5

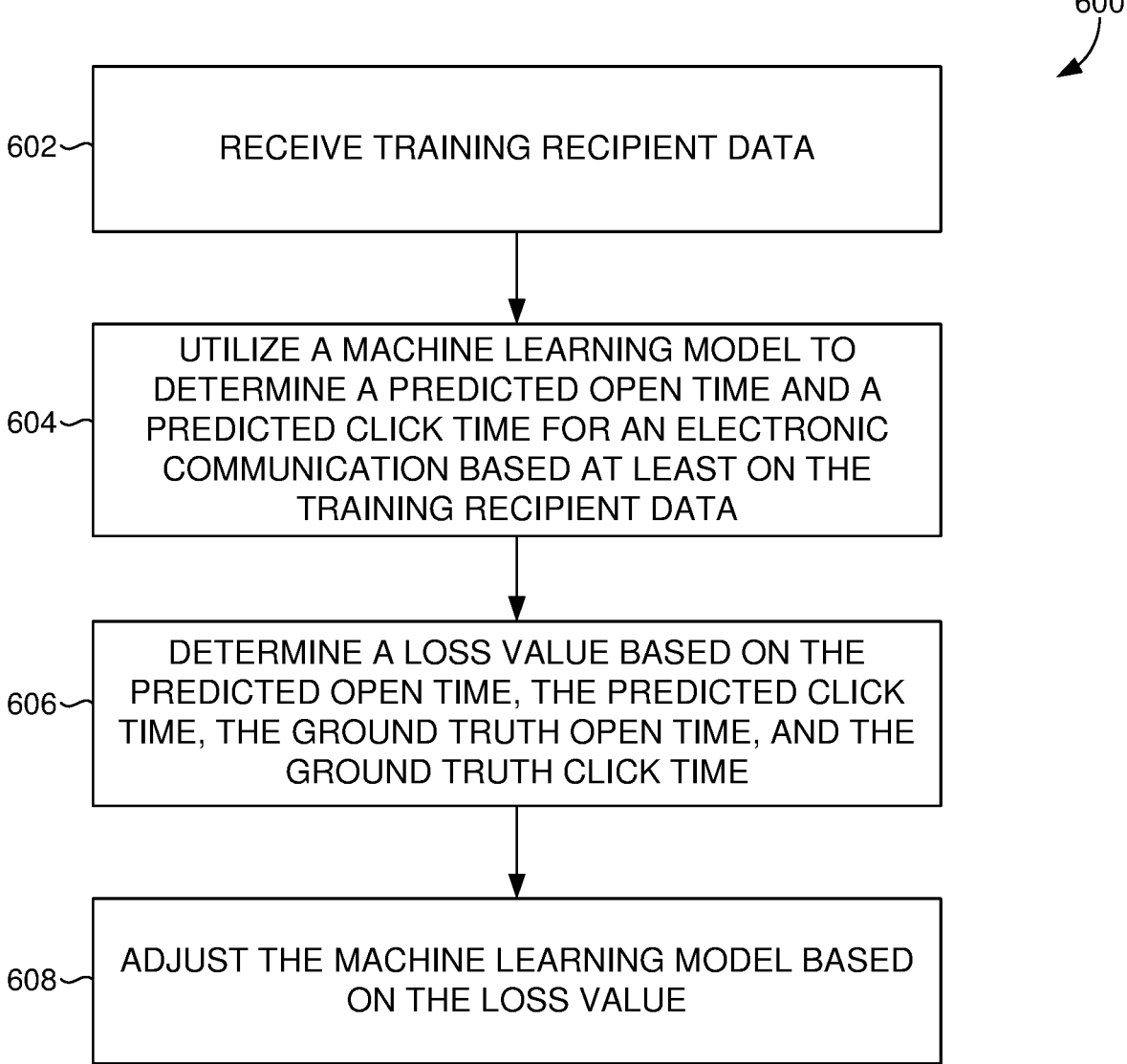

600

602~ RECEIVE TRAINING RECIPIENT DATA

604~ UTILIZE A MACHINE LEARNING MODEL TO DETERMINE A PREDICTED OPEN TIME AND A PREDICTED CLICK TIME FOR AN ELECTRONIC COMMUNICATION BASED AT LEAST ON THE TRAINING RECIPIENT DATA

606~ DETERMINE A LOSS VALUE BASED ON THE PREDICTED OPEN TIME, THE PREDICTED CLICK TIME, THE GROUND TRUTH OPEN TIME, AND THE GROUND TRUTH CLICK TIME

608~ ADJUST THE MACHINE LEARNING MODEL BASED ON THE LOSS VALUE

702 ~ RECEIVE TRAINING RECIPIENT DATA

704 ~ UTILIZE A MACHINE LEARNING MODEL TO DETERMINE A PREDICTED OPEN TIME FOR AN ELECTRONIC COMMUNICATION BASED AT LEAST ON THE TRAINING RECIPIENT DATA

706 ~ DETERMINE A BIASED LOSS VALUE BASED ON THE PREDICTED OPEN TIME AND THE GROUND TRUTH OPEN TIME

708 ~ ADJUST THE MACHINE LEARNING MODEL BASED ON THE BIASED LOSS VALUE

OPTIMIZING SEND TIME FOR ELECTRONIC COMMUNICATIONS

BACKGROUND

Electronic communications, such as emails, are often used in business-to-business (B2B) marketing strategies and campaigns. Compared to business-to-consumer (B2C) scenarios, B2B communications are typically sent on a smaller scale and received by potential or existing "leads" of another business, which may be referred to as an account. Additionally, there is typically a higher expectation that leads will open the electronic communications compared to B2C communications, and B2B communications often have actionable content, such as attending an event or arranging a call. As such, B2B communications may have time-sensitive information such that timing the B2B communication to maximize engagement is important, and there is a need to optimize send time of these electronic communications to ensure that they will be opened and read.

Conventional technologies for optimizing send time for electronic communications include predicting a key performance indicator (KPI), such as a time when an email is opened, to determine a send time. However, particularly for B2B communications, there are multiple tasks from which effectiveness of the electronic communication can be determined. For example, for some communications, effectiveness of the communication not only depends on it being opened but also on whether content within the communication is selected or clicked. As such, it may be desirable to predict times for both of these tasks (e.g., an open time and a click time) when optimizing send time for a communication. Existing technologies only utilize one of these tasks as a KPI or utilize separate models to predict for different KPIs, which may require additional computing resources.

Additionally, because B2B electronic communications often request recipient engagement and may include time-sensitive information, such as meeting or event invitations, it may be more effective to send the communication earlier rather than later to avoid the recipient missing the meeting or event information. For conventional models that predict open times, error on either side of a prediction is treated the same such that conventional models may be just as likely to erroneously overpredict the open time than under predict it, which may result in the recipient missing opportunities presented in the communications.

SUMMARY

Embodiments of the present disclosure are directed towards an improved electronic communication system that determines send time based on a multi-task prediction using a machine learning model. The machine learning model, such as a neural network, utilizes recipient data for an intended recipient of the communication (e.g., e-mail) to predict both an open time that represents when the recipient will open the electronic communication and a click time that represents when the recipient will click on or otherwise select the content of the communication. Based on the predicted open and click times, a send time is determined and a schedule is generated for transmitting the electronic communication. Additionally, when training the machine learning model, the loss used for adjusting the model may be a biased loss determined from a function that penalizes overpredicting the open time. As such, the loss value may be determined using different rules depending on whether the predicted time is greater than the actual time or not.

BRIEF DESCRIPTION OF THE DRAWINGS

FIG. 5 depicts an example method for scheduling transmission of an electronic communication based on an optimized send time, in accordance with various embodiments;

FIG. 6 depicts an example method for training a send time optimizer, in accordance with various embodiments;

DETAILED DESCRIPTION

Figure 1A:
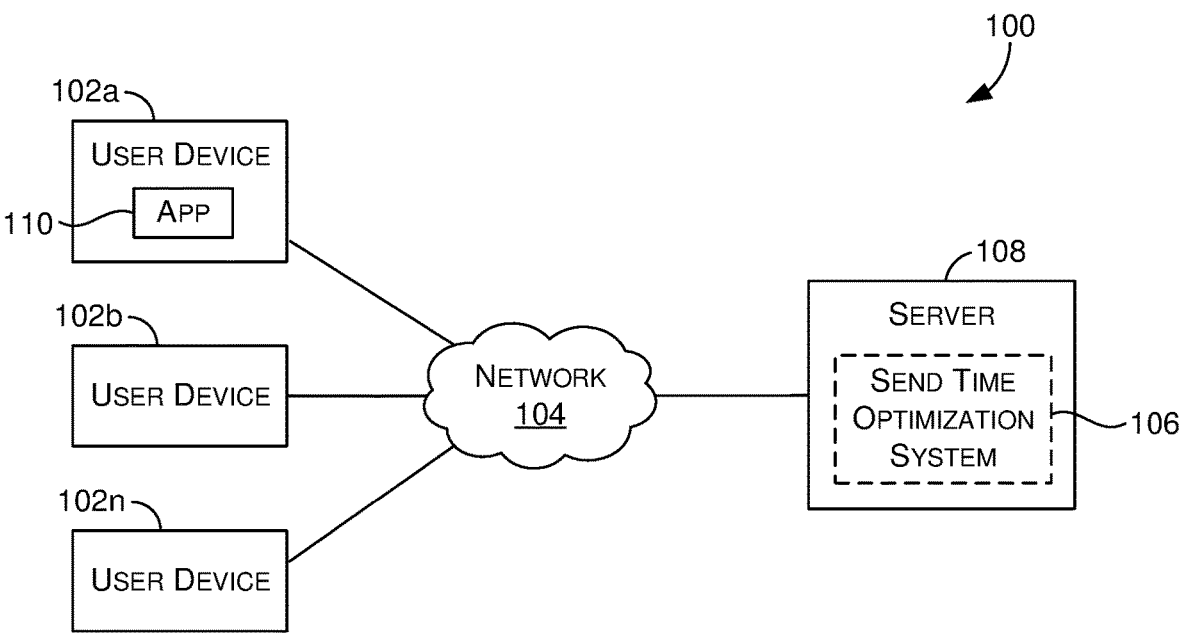
FIG. 1A depicts an example configuration of an operating environment in which some implementations of the present disclosure can be employed, in accordance with various embodiments.

The object matter of the present invention is described with specificity herein to meet statutory requirements. However, the description itself is not intended to limit the scope of this patent. Rather, the inventors have contemplated that the claimed object matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Electronic communications, such as e-mails, are often used in business-to-business (B2B) marketing strategies and campaigns. Compared to business-to-consumer (B2C) scenarios, B2B communications are typically sent on a smaller scale and received by potential or existing "leads" of another business, which may be referred to as an account. Additionally, there typically is a higher expectation that leads will open the electronic communications compared to B2C communications, and B2B communications often have actionable content, such as attending an event or arranging a call. As such, B2B communications may have time-sensitive information such that timing the B2B communication to maximize engagement is important, and there is a need to optimize send time of these electronic communications to ensure that they will be opened and read.

Conventional technologies for optimizing send time for electronic communications include predicting a key performance indicator (KPI), such as a time when an email is opened, to determine a send time. However, particularly for B2B communications, there are multiple tasks from which effectiveness of the electronic communication can be determined. For example, for some communications, effectiveness of the communication not only depends on it being opened but also on whether content within the communication is selected or clicked. As such, it may be desirable to predict times for both of these tasks (e.g., an open time and a click time) when optimizing send time for a communication. Existing technologies only utilize one of these tasks as a KPI or utilize separate models to predict for different KPIs, which may require additional computing resources.

Additionally, because B2B electronic communications often request recipient engagement and may include time-sensitive information, such as meeting or event invitations, it may be more effective to send the communication earlier rather than later to avoid the recipient missing the meeting or event information. For conventional models that predict open times, error on either side of a prediction is treated the same such that conventional models may be just as likely to erroneously overpredict the open time (i.e., predicting a time later than the actual time) than underpredict it, which may result in the recipient missing opportunities presented in the communications.

Accordingly, embodiments of the present disclosure are directed to an improved electronic communication system (referred to herein as a send time optimization system) that addresses the technical difficulties of the existing systems with respect to failing to or inefficiently optimizing send times for multiple KPIs and losing opportunities for engagement when predicting open or click times too late. In particular, as described herein, the send time optimization system determines a send time for an electronic communication using a predicted open time and a predicted click time from a machine learning model that is trained for both tasks. A single machine learning model, which may be a neural network, predicts open time and click time contemporaneously, which conserves computer memory and time that would otherwise be expended by predicting these tasks separately.

To predict an open time and a click time of the electronic communication, recipient data is input into the machine learning model. The recipient data may include information about or a characteristic of the intended recipient of the electronic communication or historical information about the recipient's past engagement or electronic communication patterns. Further, in some aspects, the recipient data includes information of a broader organization to which the recipient belongs, which may include characteristics or status of the organization and/or historical information about past engagement and communication patterns of employees or members of the organization.

Based on the recipient information, the machine learning model determines a predicted open time and a predicted click time for the electronic communication. For example, the predicted open time may be between 10 am and 11 am and the predicted click time may be between 11 am and 12 pm. Based on the predicted open and click time, a send time is determined by applying a set of pre-defined rules. In some embodiments, the send time may be a pre-determined period of time (e.g., 5 minutes) prior to the earlier of the predicted open time and click time. For example, in the previous example, the send time may be determined to be 9:55 am. Using the send time, a schedule is generated for transmitting the communication. The schedule may include times and dates for multiple electronic communications, each having a send time optimized based on the recipient data.

The machine learning model makes the predictions for both tasks contemporaneously. The model, which may be a neural network, is trained using a joint loss that measures an error in predicting both the click time and the open time. By using a single model trained to predict both open time and click time, send time may be optimized for both tasks while conserving computing memory and time that would otherwise be expended if these task were predicted separately.

To help ensure timely transmission of electronic communications, some embodiments of the present disclosure include training the machine learning model so that it is biased towards predicting earlier open times. As such, the machine learning model is trained using a biased loss that is determined by applying different rules depending on whether the predicted open time is later than the actual, ground truth open time. For instance, if the predicted open time is later than the actual ground truth open time, a penalty value may be applied to what would otherwise be computed as the loss. In this way, the machine learning model may be more apt to predict an open time that is earlier than the actual open time, which reduces the risk of the recipient not opening the communication until time sensitive content, such as a live webinar, expires.

Turning now to FIG. 1A, an example configuration of an operating environment 100 in which some implementations of the present disclosure can be employed is depicted. It should be understood that the illustrated environment 100 and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, some of the elements described herein in connection with figures herein, including FIGS. 1A-1B and 2-3, are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that environment 100 shown in FIG. 1A is an example of one suitable operating environment. Among other components not shown, environment 100 includes a number of user devices, such as user devices 102a and 102b through 102n, network 104, and server(s) 108. Each of the components shown in FIG. 1 may be implemented via any type of computing device, such as one or more of computing device 800 described in connection to FIG. 8, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure.

Each may comprise a single device or multiple devices cooperating in a distributed environment.

User devices 102a through 102n may be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device with a built-in camera or capable of being connected to a camera.

User devices 102a through 102n may include one or more processors and one or more computer-storage media. The computer-storage media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

Application 110 may generally be any application capable of facilitating the exchange of information between user devices 102a through 102n and the server(s) 108 in carrying out steps for send time optimization. In some implementations, application 110 comprises a web application that can run in a web browser and could be hosted at least partially on the server-side of environment 100. In addition, or instead, application 110 may comprise a dedicated application, such as an application having predictive functionalities and/or electronic communication functionalities. In one example, application 110 is an application that provides for marketing automation, such as Adobe® Marketo®. Additionally or alternatively, an example embodiment of application 110 is integrated with and/or performs services for an electronic communication software, such as text messaging or chat applications and/or e-mail applications. In some cases, application 110 is integrated into the operating system (e.g., as a service). It is, therefore, contemplated herein that "application" be interpreted broadly.

In accordance with embodiments herein, the application 110 facilitates optimizing send times for electronic communications, such as e-mails, text messages, and group chats. In particular, application 110 facilitates optimizing send times for electronic communications by predicting one or more task times, such as open time and click time, for a particular recipient. In example aspects, an intended recipient is a lead of an account associated with the user such that the term "lead" may be used to refer to a communication recipient. In example embodiments, a recipient or group of recipients (such as, for example, a group of recipients associated with a particular account) and an electronic communication may be selected by a user of application 110. A "user" can be a marketer, publisher, editor, author, or other person who employs the send time optimization system to determine send times for electronic communications. A user may designate a recipient or group of recipients through application 110, and recipient information may be utilized to determine an optimal send time to help ensure the electronic commination is effective.

As described herein, server 108 facilitates predicting one or more tasks associated with the electronic communication, such as open time and click time, to optimize send time via send time optimization system 106. Server 108 includes one or more processors, and one or more computer-storage media. The computer-storage media includes computer-readable instructions executable by the one or more processors. The instructions may optionally implement one or more components of send time optimization system 106, described in additional detail below.

Send time optimization system 106 determines a send time for an electronic communication intended to be sent to a recipient or group of recipients. Send time optimization system 106 utilizes recipient information for the selected recipient or group of recipients to predict one or more tasks, such as an open time and a click time, and the predicted task(s) are utilized to determine an optimal send time. In some embodiments, a single pass of a machine learning model is utilized to predict an open time and a click time, which are used to determine the send time for an electronic communication to the lead. In further embodiments, the model utilized by send time optimization system 106 is biased towards determining an earlier send time through the loss function utilized in training the machine learning model.

For cloud-based implementations, the instructions on server 108 may implement one or more components of send time optimization system 106, and application 110 may be utilized by a user to interface with the functionality implemented on server(s) 108. For example, in some cases, application 110 comprises a web browser utilized to access functionality of send time optimization system 106 on server 108. In other cases, server 108 may not be required, as further discussed with reference to FIG. 1B. For example, the components of send time optimization system 106 may be implemented completely on a user device, such as user device 102a. In this case, send time optimization system 106 may be embodied at least partially by the instructions corresponding to application 110.

Figure 1B:
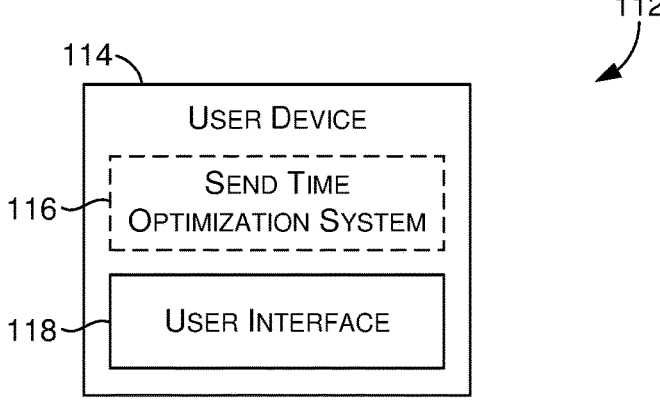
FIG. 1B depicts an example configuration of another operating environment in which some implementations of the present disclosure can be employed, in accordance with various embodiments.

Referring to FIG. 1B, aspects of an illustrative operating environment 112 are shown, in accordance with various embodiments of the present disclosure. FIG. 1B depicts a user device 114, in accordance with an example embodiment, configured to allow for a send time optimization system 116 to determine send times for electronic communications to a recipient or group of recipient. The user device 114 may be the same or similar to user device 102a-102n of FIG. 1A and may be configured to support the send time optimization system 116 (as a standalone or networked device). For example, the user device 114 may store and execute software/instructions to facilitate interactions between a user and the send time optimization system 116 via the user interface 118 of the user device.

It should be understood that any number of user devices, servers, and other components may be employed within operating environment 100 and/or environment 112 within the scope of the present disclosure. Each may comprise a single device or multiple devices cooperating in a distributed environment.

Figure 2:
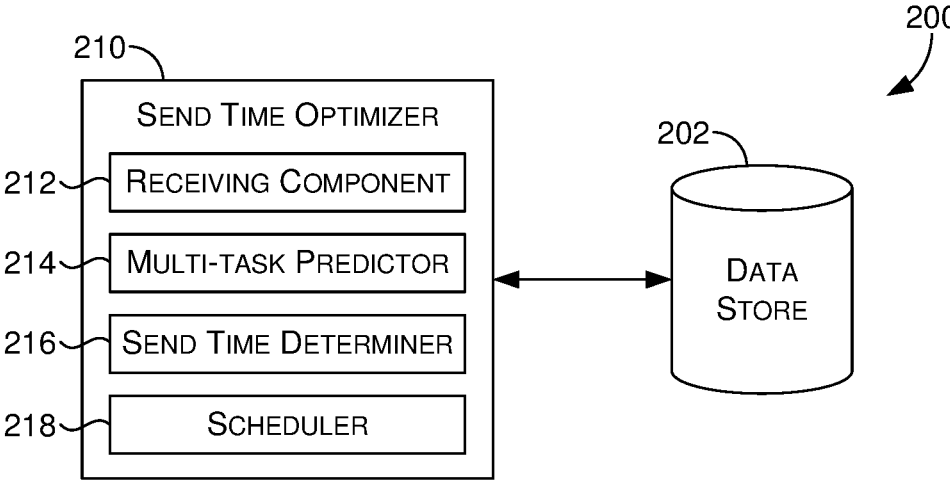
FIG. 2 depicts an example send time optimization system, in accordance with various embodiments.

FIG. 2 depicts an example configuration of a send time optimization system 200, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8. Some embodiments of send time optimization system 200 may be implemented in operating environment 100, such as embodied by send time optimization system 106 in FIG. 1A, or operating environment 112, such as embodiment by send time optimization system 116 in FIG. 1B.

Embodiments of send time optimization system 200 include send time optimizer 210 and data store 202. Send time optimizer 210 is generally responsible for determining send times for electronic communications to one or more recipients and, in some embodiments, scheduling transmission of electronic communications in accordance with determined send times. As such, embodiments of send time optimizer 210 include a receiving component 212, a multi-task predictor 214, and a send time determiner 216. Further, as depicted, embodiments of send time optimizer 210 may also include a scheduler 218. The foregoing components of send time optimizer 210 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. While the various components are depicted as being separate, it should be appreciated that a single component can perform the functionality of all depicted components. Additionally, in implementations, the functionality of the components can be performed using additional components and/or engines. Further, it should be appreciated that the functionality of the components can be provided by a system separate from the send time optimization system 200.

As shown, send time optimizer 210 operates in conjunction with data store 202. Data store 202 stores computer instructions (e.g., software program instructions, routines, or services), data, and/or models used in embodiments described herein. In some implementations, data store 202 stores information or data received via the various engines and/or components of send time optimizer 210 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 includes recipient data. Recipient data includes data related to users who are the intended recipients of one or more electronic communications. A recipient may be a potential customer or client and may be referred to herein as a lead. Recipient data may include information about the particular intended recipient, such as the recipient's age, geographic location, and job title. Recipient data may also include historical recipient engagement information indicating how the recipient has previously engaged with electronic communications or other content. For example, recipient data may include open times and click times for previously sent electronic communications. Recipient data within data store 202 may further includes features derived from the historical data, such as a time when a user was most active on a webpage, the number of emails a user opens within a given time period, and the number of times the user registered for an event. Additionally, recipient data may include historical electronic communications data even if the information does not involve active engagement from the recipient. Such historical communication data may include the number of emails previously sent to the recipient within a predetermined time frame, such as the past 60 days. Further examples of recipient data are described below with respect to receiving component 212 of send time optimizer 210.

In some aspects, recipients are part of a group or organization, such as a business, that may be referred to as an account. As such, in some embodiments, the recipient data in data store 202 may include a subset of information referred to as account data. Account data generally refers to data related to accounts associated with an organization, such as a business, of an intended recipient. Account data may include information describing the account, such as the geographic location, time zone, number of employees of the account, number of leads within the account, or a stage in a sales and/or revenue funnel. Account data may further include describing information about the historical behavior of employees or leads of the account, such as the active hours for the account based on account leads' open and click activities, number of times a demo was given to the account, number of webpage visits from leads or other employees of the account. Further examples of account data are described with respect to receiving component 212 of send time optimizer 210.

Send time optimizer 210 is generally responsible for determining a send time for an electronic communication to a recipient to increase the likelihood of the recipient engaging with the electronic communication content. Embodiments of send time optimizer 210 utilize recipient data corresponding to an intended recipient of an electronic communication to predict times for certain engagement tasks associated with the communication and utilizes the prediction(s) to determine a send time. In example embodiments, send time optimizer 210 also schedules transmission of the electronic communication in accordance with the determined send time.

Receiving component 212 is generally responsible for receiving recipient data for an intended recipient of an electronic communication. Receiving component 212 may receive the recipient data from data store 202. In some aspects, receiving component 212 retrieves recipient data corresponding to an intended recipient based on receiving an indication of the intended recipient. In other aspects, receiving component 212 accepts recipient data that is transmitted by another component based on an indication of an intended recipient. The indication of the intended recipient may be provided via user input, such as through selection of a recipient's name or identifier (e.g., user name, email address, phone number) or inputting a recipient's name or identifier. In some embodiments, an indication of a recipient is provided by user selection of a group of recipients, such as may occur by selection of an account having multiple recipients, or input of a group of recipients, such as through an electronic spreadsheet.

Recipient data may be information about or a characteristic of the particular intended recipient. Additionally or alternatively, recipient data may be historical information, such as the recipient's past engagement or electronic communication patterns. A non-limiting example list of recipient data may include:

Recipient's Age in System: The length of time that a recipient has been in the user's system. In exemplary aspects, a recipient's age in system is calculated in a number of weeks, but it may also be calculated as days, months, or years.

Job title: Job title of the recipient.

Recipient ID: A unique identifier for a recipient (e.g., user ID, email address, phone number).

Time Zone: Recipient's time zone.

Recipient UTC offset: UTC offset based on recipient's time zone.

Recipient of Private Organization: Indicates whether the recipient belongs to a private organization, which may be presented as a Boolean value.

Recipient Category: Indicates whether the recipient is a current customer or a prospective customer.

Recipient Organization type: The type of organization to which the recipient belongs. In some aspects, recipient organization type is a size (e.g., small, medium, or large) of the recipient's organization, which may be calculated based on the number of leads within the organization.

Recipient Industry: Indicates the industry to which the recipient and/or the recipient's organization belongs.

Program Type: The type of marketing program that the recipient is part of when an electronic communication is to be sent.

Lead Score: The score of a recipient when the recipient is a lead for prospective business. The lead score, which may be a ranking, may represent an actual or perceived value the recipient-lead represents to a product or business based on the recipient-lead's engagement.

Lead Score Change: Number of times the recipient's lead score has changed.

Task Type: One or more types of tasks being tracked. In some examples, a task type is sent electronic communication, opening an electronic communication, or clicking an electronic communication.

Total Sent Count: Number of electronic communications previously sent to the recipient. In exemplary aspects, this count is the number of communications sent by a particular user or by a particular organization, such as the employer of the user.

Total Open Count: Number of electronic communications previously opened by the recipient. In exemplary aspects, this count is the number of communications sent by a particular user or organization that were opened by the recipient.

Total Click Count: Number of clicks on electronic communications by the recipient. A click may be selection of a link within the electronic communication. In exemplary aspects, this count is the number of clicks in communications sent by a particular user or by a particular organization.

Success Program Count: Number of programs or campaigns to which a recipient was previously added and was successful. In some aspects, success is determined based on whether the recipient became a customer through the program or campaign.

Total Program Count: Number of programs or campaigns to which a recipient has been previously added.

Program Success Rate: The rate of success of recipient's programs. In exemplary aspects, this feature may be a ratio of success program count to total program count.

Recent Communication Sent Count: Count of electronic communications sent to the recipient within a predefined time frame. The predefined time frame may be the previous 330 days, the previous 120 days, the previous 60 days, or the previous 30 days.

Recent Communication Open Count: Count of electronic communications opened by the recipient within a predefined time frame. The predefined time frame may be the previous 330 days, the previous 120 days, the previous 60 days, or the previous 30 days.

Recent Communication Click Count: Count of clicks of electronic communications within a predefined time frame. The predefined time frame may be the previous 330 days, the previous 120 days, the previous 60 days, or the previous 30 days.

Webpage Active Time: A time frame in which the recipient was most active based on webpage activities. In some aspects, this time frame is an hour such that this feature is the hour during which the recipient was most active.

Webpage Visit Count: Number of webpage visits by the recipient. In exemplary aspects, this count is the number of visits to a particular webpage or a webpage or a particular organization.

Invitation Count: Number of times a recipient was invited to an event, such as a webinar. In exemplary aspects, this count is the number of invitations from a particular user or organization.

Registration Count: Number of times a recipient was registered to an event, such as a webinar. In exemplary aspects, this count is the number of registrations for an event of a particular user or organization.

Attendance Count: Number of times a recipient attended an event, such as a webinar. In exemplary aspects, this count is the number of times the recipient attended an event of a particular user or organization.

First Active Hour: The hour of the day that a recipient is most active. In exemplary embodiments, activeness is determined from historical open and click activities (e.g., opening and clicking on electronic communications).

Second Active Hour: The second hour of the day that a recipient is most active following the first active hour.

Third Active Hour: The third hour of the day that a recipient is most active following the second active hour.

Fourth Active Hour: The fourth hour of the day that a recipient is most active following the third active hour.

Fifth Active Hour: The fifth hour of the day that a recipient is most active following the fourth active hour.

Sixth Active Hour: The sixth hour of the day that a recipient is most active following the fifth active hour.

First Max Open Hour: The hour of the day with most opens by the recipient relative to the number of communications sent to the recipient. In exemplary aspects, the number of opens calculated for each hour to determine the max open hour is calculated based on a total open count divided by a total sent count for the hour.

Second Max Open Hour: The second hour of the day with the most opens by the recipient relative to the number of communications sent to the recipient following the first max open hour.

Third Max Open Hour: The third hour of the day with the most opens by the recipient relative to the number of communications sent to the recipient following the second max open hour.

Fourth Max Open Hour: The fourth hour of the day with maximum opens by the recipient relative to the number of communications sent to the recipient following the third max open hour.

Fifth Max Open Hour: The fifth hour of the day with maximum opens by the recipient relative to the number of communications sent to the recipient following the fourth max open hour.

Sixth Max Open Hour: The sixth hour of the day with maximum opens by the recipient relative to the number of communications sent to the recipient following the fifth max open hour.

Batch Open Count: Number of electronic communications under a batch program type, such as an e-mail batch program, that were opened by the recipient.

Event Open Count: Number of electronic communications under an event program type that were opened by the recipient.

Nurture Open Count: Number of electronic communications under a nurture program type that were opened by the recipient.

Program Open Count: Number of electronic communications under a program type that were opened by the recipient.

Webinar Open Count: Number of electronic communications under a webinar program type that were opened by the recipient.

Event Active Hour: An hour of the day that the recipient is active with respect to opening electronic communications under an event program type.

Batch Active Hour: An hour of the day that the recipient is active with respect to opening electronic communications under a batch communication program type.

Program Active Hour: An hour of the day that the recipient is active with respect to opening electronic communications under a program type.

Nurture Active Hour: An hour of the day that the recipient is active with respect to opening electronic communications under a nurture program type.

Open Counts for Predefined Periods: Number of electronic communications opened within predetermined periods of times. In some aspects, each predetermined period of time corresponds to a two-hour block within a day. For example, there may be 12 open counts corresponding to hours 0 and 1, hours 2 and 3, hours 4 and 5, hours 6 and 7, hours 8 and 9, hours 10 and 11, hours 12 and 13, hours 14 and 15, hours 16 and 17, hours 18 and 19, hours 20 and 21, and hours 22 and 23.

Time to Open: The average time between when an electronic communication, such as an e-mail, is sent to a recipient and when the recipient opens it. In some aspects, this time is calculated in seconds.

STD of Time to Open: The standard deviation of time to open.

In some embodiments, receiving component 212 receives a subset of the above recipient data. For instance, receiving component may receive a recipient ID, an activity type, a program type, a job title, a recipient UTC offset, an indication of whether the recipient is of a private organization, a recipient organization type, a recipient category type, and a recipient industry.

In some aspects, receiving component 212 also receives recipient information that relates to an account to which the recipient belongs and, as such, is referred to as account data. Receiving component 212 may receive the account data from data store 202 and in the same manner described for other recipient data. Account data may be information describing characteristics or status of an account. Additionally or alternatively, account data may be information describing the historical behavior of employees or leads of the account. A non-limiting example list of account data may include:

Account Name: Name of the account.

Location: Geographic location of the account.

Time Zone: Preferable time zone of the account.

Number of Employees: Number of employees of the account.

Account Size: A categorical size of the account based on the number of employees. In some embodiments, the account size may be one of small, medium, or large.

Account Group: A group in which the account is placed based on the revenue of the account.

Number of Leads: Number of leads associated with the account.

Account First Active Hour: The most active hour of the day for the account based on all of the account's recipients' historical open and click activities.

Account Second Active Hour: The second most active hour of the day for the account based on all of the account's recipients' historical open and click activities.

Account Third Active Hour: The third most active hour of the day for the account based on all of the account's recipients' historical open and click activities.

Customer Status: Indicates whether or not an account is a current customer of the user or organization to which the user belongs.

Sales Stage: The stage of the sales funnel in which the account is located.

Marketing Stage: The stage of the revenue funnel in which the account is located.

Demo View Count: Number of times that a demonstration has been given to an account.

Blog Visit Count: Number of blogs visits from the account.

Video Play Count: Number of times a video was viewed by a recipient belonging to the account.

Account Score: A score of the account based on the activities/engagement, such as open and click activities, registration and attendances of events, views of video and/or webpage visits, from the account Further, embodiments of receiving component 212 receive information about the electronic information that is intended to be sent to the recipient. This electronic communication information may be selected or otherwise input by a user. A non-limiting list of example electronic communication information that may be received by receiving component 212 may include:

Send Week Day: Date of the week that the electronic communication is intended to be sent.

Marketing Program ID: Identifies the particular marketing program under which an electronic communication is to be sent.

Campaign ID: Identifies the particular marketing campaign under which an electronic communication is to be sent.

Campaign Run ID: Identifies the particular run of a marketing campaign under which an electronic communication is to be sent.

Multi-task predictor 214 is generally responsible for predicting tasks based on the information received by receiving component 212. As such, multi-task predictor 214 may predict when an intended electronic communication recipient will perform particular tasks with respect to the electronic communication. In exemplary embodiments, for instance, multi-task predictor 214 predicts when a recipient will open the electronic communication and when a recipient will click on a link within the electronic communication. Multi-task predictor 214 may make this prediction based on the recipient data, which may include account information, received by receiving component 212. Further, multi-task predictor 214 may make this prediction based on the email information received by receiving component 212, such as an indication of the intended day of the week the communication will be sent to the recipient.

In exemplary aspects, multi-task predictor 214 utilizes a single machine learning model to determine times the recipient will perform multiple tasks, such as open an electronic communication and click on a link within the communication. In this way, times for multiple tasks may be predicted together, which is more effective for use in sending communications to maximize a desired goal, such as movement of the communication recipient through a conversion funnel. Further, utilizing a single machine learning model to predict multiple tasks conserves computer memory and takes less time than when these tasks are predicted. In exemplary aspects, multi-task predictor 214 utilizes a neural network to predict the multiple tasks. In some aspects, the neural network is a fully-connected feedforward neural network. Further, the neural network utilized by multi-task predictor 214 may embed or encode the recipient data into an intermediate representation and apply the intermediate representation through a first set of layers before the neural network splits into different branches, where each branch outputs a prediction for a separate task. For example, an open time prediction may be output from a first branch of the neural network, and a click time prediction may be output from a second branch. An example architecture of a machine learning model utilized by multi-task predictor 214 is described in connection with FIG. 4.

Figure 3:
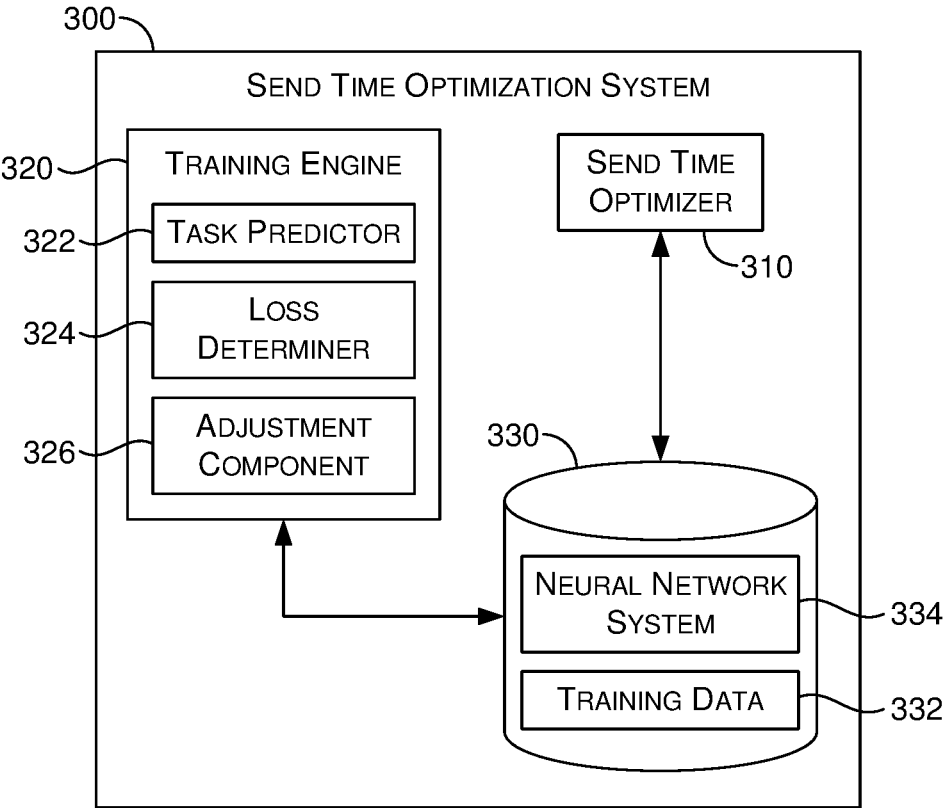
FIG. 3 depicts an example send time optimization system, in accordance with various embodiments.
Figure 7:
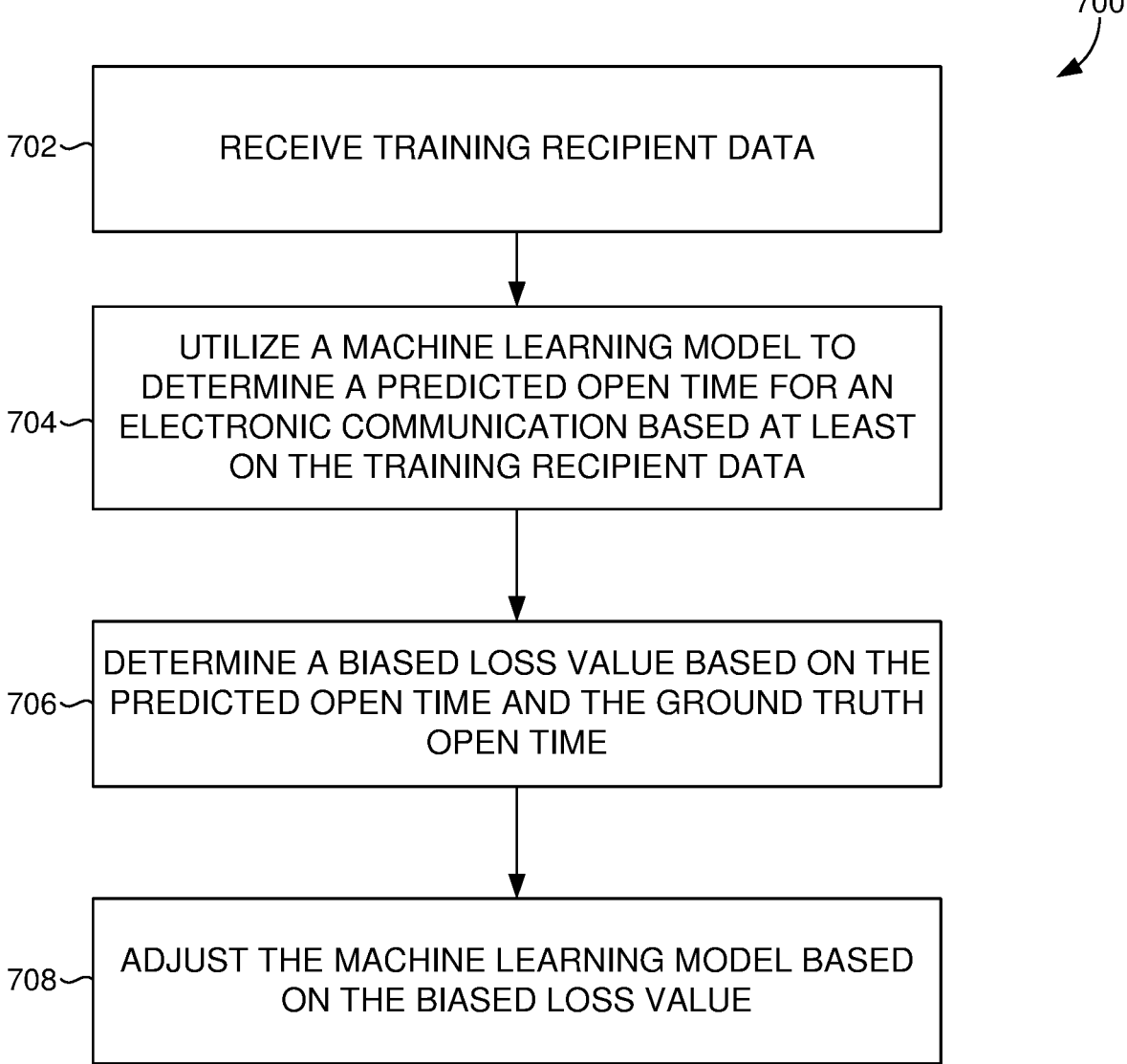
FIG. 7 depicts an example method for training a send time optimizer, in accordance with various embodiments.

The machine learning model, such as a neural network, utilized by multi-task predictor 214 is trained utilizing training data as described further with respect to FIGS. 3 and 6-7. The model may be trained with a joint loss representing errors in predicting multiple tasks, which allows the model to be optimized for both tasks. Additionally, in some implementations, the machine learning model is trained with a biased loss function such that model is biased toward predicting an earlier time over a later time. For example, this biased loss penalizes open time and/or click time predictions when they are past the actual (ground truth) open and click times in the training data more than open time and/or click time predictions that are before (earlier) than the actual open and click times. Biasing the model to penalize predicting beyond the actual time more than penalizing predicting before the actual time is particularly useful when the electronic communication has time-sensitive information, such as an upcoming webinar, as it helps ensure that the electronic communications will not be sent when it is too late for a timely open and click by the recipient.

Send time determiner 216 is generally responsible for determining a time to send an electronic communication to the recipient. Send time determiner 216 determines the send time based on the predictions from the multi-task predictor 214. For example, in exemplary embodiments, the send time is determined from the predicted open time and the predicted click time. Send time determiner 216 determines the send time by automatically applying a set of predefined rules. In one example, the send time determiner 216 determines the send time of an electronic communication to be the earlier of the predicted open time or predicted click time. In another example, the send time determiner 216 determines the send time to be a pre-determined amount of time prior to the earlier of the predicted open time or the predicted click time. In some embodiments, the pre-determined amount of time is between 30 minutes and 1 minute. For example, the send time may be five minutes earlier than the earlier of the predicted open time or the predicted click time.

Some embodiments of send time optimizer 210 include scheduler 218, which is generally responsible for scheduling the transmission of the electronic communication in accordance with the send time determined by send time determiner 216. A schedule generated by scheduler 218 may be a time and date for transmitting one or more electronic communications. The date of the transmission may be determined based on user input indicating an intended or desired date to send the electronic communication to the recipient, and the time may be the send time that is determined by the send time determiner 216. In some embodiments, send time optimizer 210 is utilized to determine send times for multiple electronic communications to different recipients, such as in the case of bulk or batch e-mails. As such, scheduler 218 may determine a schedule that includes a time and a date for transmitting an electronic communication to each recipient.

In some embodiments, scheduler 218 may run as a service or act in conjunction with a software program that transmits electronic communications, such as programs that facilitate transmission of e-mail, texts, chats, and messages. For example, scheduler 218 may be a plugin that is integrated into an e-mail software application. In another example, scheduler 218 may transmit a generated schedule to a separate application, and the application may use the schedule to transmit the electronic communications.

In some aspects, scheduler 218 sets a schedule for one or more electronic communications to be transmitted automatically. In this way, once scheduler 218 schedules the transmission based on the determined send time(s) and date(s), the electronic communications within the schedule will be automatically transmitted at the scheduled date and time without requiring further action from a user. In some instances, the schedule may be set to automatically execute but can be modified by a user. For example, scheduler 218 may set an initial schedule, and prior to automatic execution of the schedule, a user may change the date and/or time of one or more electronic communications within the schedule. In alternative aspects, scheduler 218 generates a schedule for one or more electronic transmissions, where user confirmation or other user input is required prior to executing the schedule. For example, a schedule generated by scheduler 218 may be provided to a user, via a user interface, and the user may input an indication that the schedule should be executed, changed, or cancelled. The schedule then may be executed, in accordance with the user's input, by scheduler 218 or by another component.

Referring to FIG. 3, aspects of an illustrative send time optimization system 300 are shown, in accordance with various embodiments of the present disclosure. Send time optimization system 300 includes training engine 320, send time optimizer 310, and data store 330. The foregoing components of send time optimization system 300 may be implemented in operating environment 100 of FIG. 1A or operating environment 112 of FIG. 1B. The components of send time optimization system 300 may be integrated into a single computing device or implemented in a distribution fashion, for example, across server 108 and user devices 102a-n of FIG. 1A.

Data store 330 is used to store computer instructions (e.g., software program instructions, routines, or services), data, and/or models used in embodiments described herein. In some implementations, data store 330 stores information or data received via the various components of send time optimization system 300 and provides the various components with access to that information or data as needed. Data store 330 in FIG. 3 may represent an embodiment of data store 202 and, as such, may store any of the data described with respect to data store 202. Although depicted as a single component, data store 330 may be embodied as one or more data stores. Further, the information in data store 330 may be distributed in any suitable manner across one or more data stores for storage (which may be hosted externally).

In embodiments, data stored in data store 330 includes training data 332. Training data, which may also be referred to as reference data, generally refers to data used to train a neural network, or portion thereof. As such, training data 332 includes training input data that is input into a neural network for predicting one or more tasks that will be performed by a recipient of an electronic communication. This training input data may include training recipient data, including training account data, and training electronic communication data. The training recipient data, training account data, and training electronic communication data may include any of the types of recipient data, account, data, and electronic communication data, respectively, described in connection with data store 202 and/or send time optimizer 210 of FIG. 2. Further aspects of training data 332 include ground truth data, which may be stored in association with the training input data. The ground truth data is utilized to determine the accuracy of any predictions generated from the training input data. For example, ground truth data may be times that electronic communications were actually opened and times that electronic communications were actually clicked on.

In some cases, data can be received by send time optimization system 300 from user devices. In other cases, data can be received from one or more data stores in the cloud. Data store 330 can also be used to store the neural network system 334.

Training engine 320 is responsible for training a machine learning model, such as neural network system 334, to predict tasks to be performed in association with an electronic communication. As depicted in FIG. 3, training engine 320 includes a task predictor 322, loss determiner 324, and an adjustment component 326. Although these components are illustrated separately, it can be appreciated that the functionality described in association therewith can be performed by any number of components. Additionally, it should be understood that, although the discussion of training engine 320 herein uses the neural network system 334 as an example, it should be understood that training engine 320 may be used to train other types of machine learning models.

Figure 4:
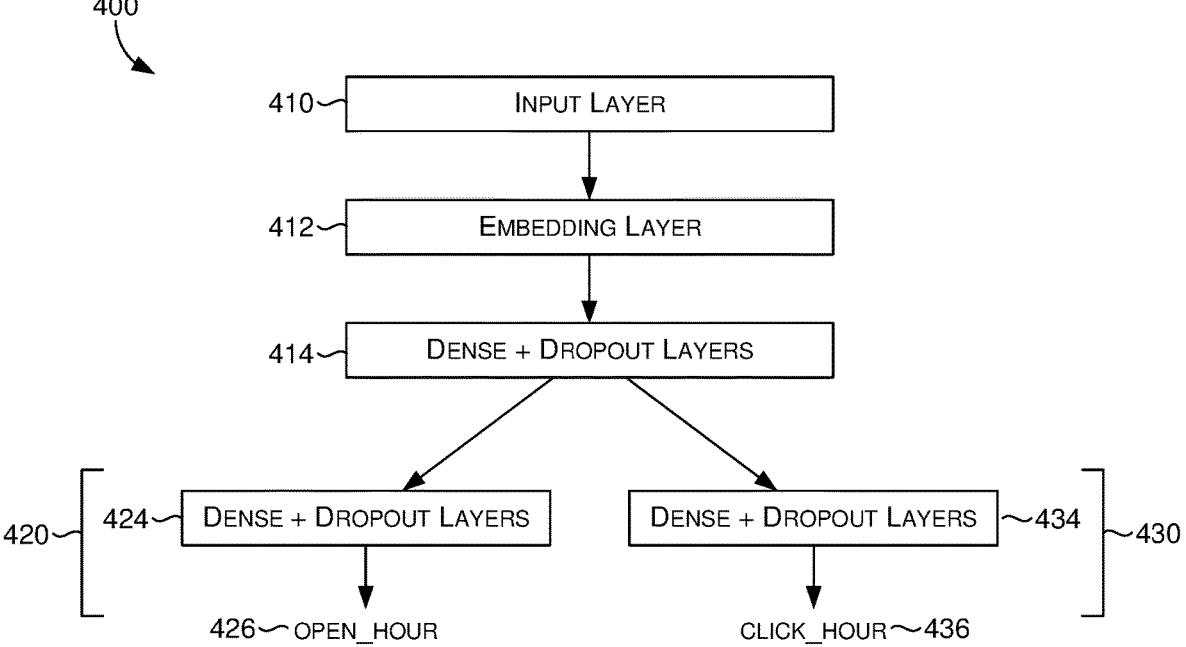
FIG. 4 depicts an example architecture for a send time optimizer, in accordance with various embodiments.

Task predictor 322 uses training input data, such as training recipient data, for training the neural network system 334. In exemplary embodiments, the neural network system 334 is a feed forward, fully-connected neural network. An example architecture of neural network system 334 is depicted in FIG. 4. From at least training recipient data corresponding to an intended recipient of an electronic communication, task predictor 322 utilizes the neural network system 334 to predict one or more tasks to be performed by the recipient. In exemplary aspects, task predictor 322, utilizing neural network system 334, predicts times for multiple tasks, during training of neural network system

334. For example, task predictor 322 may use the training input data to predict a time a recipient will open an electronic communication and a time the recipient will click on or otherwise select a link within the electronic communication. As such, neural network system 334 may have a multi-branch architecture, where the training input data for an electronic communication is contemporaneously run through two branches within the neural network, where each branch outputs a prediction for a task, such as an open time and a click time. Task predictor 322 of training engine 320 may be an embodiment of multi-task predictor 214 of FIG. 2 that is run on training data 332.

Output of task predictor 322 is compared to ground truth data, such as a ground truth open time and a ground truth click time. Generally, the comparisons to ground truth data indicate errors (or losses), which are used to adjust the neural network system 334 to reduce the amount of error in future iterations. Loss determiner 324 is generally responsible for computing errors in output of neural network system 334 by comparing the output of neural network system 334 to the ground truth in the training data 332.

As some embodiments of task predictor 322 predict for multiple tasks jointly through one pass of the neural network system 334, loss determiner 324 may compute a joint loss that represents errors for predictions of multiple tasks. For example, where neural network system 334 is utilized by task predictor 322 to predict an open time and a click time for an electronic communication, loss determiner 324 may determine a joint loss that represents the error for the open time prediction and an error for the click time prediction. In some aspects, the joint loss value is determined by finding a difference between the predicted time and actual time for each task and combining the differences. Further, in some embodiments, the differences may be weighted when combined. In an example embodiment, the loss determiner 324 computes the joint loss using the following:

$$L = w\|task1_p - task1_a\|_x + (1-w)\|task2_p - task2_a\|_x$$

where p refers to a prediction (e.g., predicted time for task 1 or predicted time for task 2), a refers to the actual (e.g., actual time for task 1 or actual time for task 2), w is the weight for task 1, (1–w) is the weight for task 2, and x represents a loss type. The task 1 may represent click time, and task 2 may represents open time. Additionally, in at least some of these embodiments, the weight of the click time loss (w) is 0.2, and the weight of the open time loss (1–w) is 0.8. Additionally, in some embodiments, x is equal to 1. This joint loss value may be computed for each pass through neural network system 334 during training.

In some embodiments, to reduce the chance of missed opportunities arising from overpredicting (i.e., predicting times that are later than the actual times), loss determiner 324 uses a loss function that penalizes overpredicting. In this way, neural network system 334 may be trained to be biased to predict a time prior to the actual time.

In exemplary aspects, the biased loss is a modified mean absolute error (MAE). A conventional MAE loss function treats predictions on both sides of the ground truth the same. The modified mean absolute error, in accordance with this disclosure, computes the loss differently based on whether the prediction is greater than or less than the ground truth. In exemplary aspects, the biased loss function is determined as follows:

$$\text{Biased loss } (pred, actual) = \begin{cases} |pred - actual|, & \text{if } pred \leq actual \\ \lambda \cdot |pred - actual|, & \text{otherwise} \end{cases}$$

As such, if a prediction determined by task predictor 322, such as an open time or a task time, is less than or equal to the actual time (i.e., the ground truth), the loss may be computed as the absolute difference between the actual and predicted times. However, where the prediction is greater than the actual, a pre-determined penalty value ($\lambda$) may be applied to the absolute difference between the actual and prediction values to compute the loss. The pre-determined penalty value may be any value greater than 1. In some embodiments, the pre-determined penalty value is 5. By penalizing predicting times beyond the actual time, the effectiveness of the neural network system 334 when employed to optimize sending electronic communications to engage recipients is increased by reducing the likelihood of determining a send time that is too late and results in a missed opportunity for recipient engagement, which is particularly important when the communication has time-sensitive information.

In exemplary aspects, this biased loss is integrated into the joint loss by utilizing the biased loss value for the pre-weighted loss value for one or more tasks. In some embodiments, the biased loss is not applied to all of the predicted tasks. For instance, in some cases in which task predictor 322 predicts open time and click time, only open time utilizes a biased loss. In this example, the loss determiner 324 may determine the overall joint loss value as follows:

$$L = w \|c_p - c_a\|_x + (1 - w) \left\| \begin{cases} |o_p - o_a|, \text{ if } o_p \leq o_a \\ \lambda \cdot |o_p - o_a|, \text{ if otherwise} \end{cases} \right\|_x$$

where c refers to click time and o refers to open time. It is contemplated, however, that a biased loss may be determined for all of the tasks, such as both click time and open time, in other embodiments.

Loss determiner 324 determines a loss value for each pass of the neural network system 334 during training, and the computed loss is utilized to "train" or improve upon neural network system 334. As such, adjustment component 326 is generally responsible for adjusting or modifying neural network system 334 based on the determined loss from loss determiner 324. The adjustment may be adjusting weights of features or any known manner of adjusting a neural network or other machine learning model for future iterations, where this process may be continued until the loss is minimized or meets a maximum allowable loss threshold.

In execution, neural network system 334, trained in accordance with training engine 320, may be utilized by a send time optimizer 310. For example, neural network system 334 may be utilized to predict an open time and a click time for an electronic communication that is intended to be sent to a recipient, and a send time may be determined based on the predicted open time and click time. A schedule for transmitting the electronic communication in accordance with the predicted open time and click time may be determined. Embodiments of send time optimizer 310 may operate in the same manner described for send time optimizer 210 of FIG. 2.

FIG. 4 depicts an example architecture 400 for a machine learning model utilized by a send time optimizer, such as send time optimizer 310 of FIG. 3 or send time optimizer 210 of FIG. 2. Architecture 400 may be a neural network architecture embodied as neural network system 334 of FIG. 3. Architecture 400 includes an input layer 410, an embedding layer 412, and hidden layers 414, 424, and 434. Input layer 410 receives input data similar to the data discussed with respect to receiving component 212 of FIG. 2. As such, the input data may include recipient data, which may include account data, and electronic communication information, such as an intended send date for the electronic communication. In embedding layer 412, the input data is embedded. Embedding the input data may include generating one or more vectors that represent the content of the input data.

After embedding, the embedded input data is passed through a first set of hidden layers 414, that may include dense layers and drop out layers. Dense layers are fully-connected layers, and drop out layers remove units to prevent overfitting. After the first set of hidden layers 414, neural network architecture 400 splits into a first branch 420 and a second branch 430. The first branch 420 and the second branch 430 are focused on different tasks being predicted. For instance, the first branch 420 may be focused on predicting an open time for an electronic communication, and the second branch 430 may be focused on predicting a click time for the electronic communication. The first branch 420 includes a second set of hidden layers 424, which may include additional dense layers and drop out layers. Similarly, the second branch 430 includes a third set of hidden layers 434, which may include additional dense layers and drop out layers. While the input of the second and third sets of hidden layers 424 and 434 is the same, the outputs correspond to different tasks. In example embodiments, the second set of hidden layers 424 of the first branch 420 outputs an open_hour prediction 426, which is a time at which a recipient is most likely to open the electronic communication, and the third set of hidden layers 434 of the second branch 430 outputs a click_hour prediction 436, which is a time at which the recipient is most likely to click on content, such as a hyperlink, within the electronic communication. Because the neural network architecture 400 of FIG. 4 includes branches 420 and 430 for different tasks stemming from the same input layer 410, predictions 426 and 436 for the two tasks can be generated contemporaneously from a single machine learning model, which conserves time and computer memory.

With reference to FIG. 5, a flow diagram is provided to show an embodiment of a method 500 for generating a schedule with an optimized send time for transmitting an electronic communication. Method 500 may be performed, for example, by send time optimizer 210 of FIG. 2 or send time optimizer 310 of FIG. 3. Method 500 and other methods disclosed herein, such as method 600 and 700, each include steps that correspond to different functions performed by the same or different hardware components on one computing device, which may be a user device (e.g., user device 102a) or a remote server (e.g., server 108). Additionally or alternatively, some or all of these steps in these methods may be performed on hardware components of different computing devices such that these methods may be performed in a distributed fashion.

At block 502, an indication of intended recipient of an electronic communication is received. This indication may be received by input from a user. User input may include selection of a recipient from a recipient list or input of a recipient identifier, such as the recipient's name, email address, phone number, or user name. In some embodiments, an indication of the recipient is provided by selection of a group of recipients, such as may occur by selection of an account having multiple recipients (e.g., leads), or input of a group of recipients, such as through an electronic spreadsheet. Embodiments of block 502 may be performed by receiving component 212 of FIG. 2.

At block 504, a predicted open time and a predicted click time for the electronic communication is determined based on recipient data about the intended recipient. A predicted open time is a time in the future that the electronic communication will be opened, and the predicted click time is a time in the future that the content, such as a hyperlink, within the electronic communication will be selected. For example, a predicted open time may be 10:30 am and a predicted click time may be 11:10 am. In some embodiments, the predicted open time and the predicted click time are each a range with a pre-determined length. For instance, some embodiments including predicting an open hour and a click hour such that the predictions may be 10 am to 11 am for open time and 11 am to 12 pm for a click time.

As the predicted open time and click time are based on information about the recipient, embodiments of method 500 may include receiving recipient data corresponding to the intended recipient based on receiving the indication of the intended recipient. Recipient data may include characteristics about the intended recipient (such as the recipient's ID, job title, category type, or industry) and/or historical information (such as the recipient's past electronic communications received and electronic communication engagement patterns).

Further, in some embodiments, the recipient information used to determine the predicted open time and predicted click time may be information about an account or organization to which the recipient belongs. For instance, the recipient may be employed by a company or otherwise associated with an organization, and in some embodiments, the company or organization may be an account to which an electronic communication is being sent as part of a marketing campaign or program. The account information may describe characteristics of the organization and/or identify historical behavior of employees or leads of the organization. For instance, account information may identify a number of employees or the first active hour of the day for the account based on all of the account leads' historical open and click activities. Additional or alternative types of recipient information that may be received as training recipient information at block 602 is described with respect to receiving component 212 of FIG. 2.

Based on the recipient information (which may include account information), the predicted open time and predicted click time are determined at block 504 utilizing a single machine learning model. By utilizing one model trained to predict both tasks, predictions for tasks can be optimized with less time and computer memory than would be consumed predicting these tasks separately. For example, block 504 may be performed utilizing a neural network trained to predict both open time and click time within a single pass through the neural network. Some embodiments of the neural network include a multi-branch architecture where there are two branches with separate layers that predict open time and click time based on the same input of recipient information. An example neural network system architecture that may be utilized at block 504 is depicted in FIG. 4. In some embodiments, a neural network utilized for block 504 employs a logistic regression algorithm. It is contemplated that other types of machine learning models and algorithms may be utilized at block 504. For example, in other embodiments, a random forest model or support vector machine may be utilized.

At block 506, based on at least the predicted open time and the predicted click time, a send time for the electronic communication is determined. Block 506 may be performed by embodiments of send time determiner 216 of FIG. 2.

Determining the send time may include applying one or more rules to the predicted open time and the predicted click time. In some embodiments, determining the send time includes determining whether the predicted open time or the predicted click time is earlier and basing the sent time on this determination. For instance, the earlier of the predicted open time and the predicted click time may be used as the send time. In other aspects, the send time is set to a predetermined period of time (e.g., 10 minutes or 1 minute) prior to the earlier of the predicted open time and the predicted click time.

At block 508, a schedule for transmitting the electronic communication to the intended recipient is generated. Block 508 may be performed by embodiments of scheduler 218 of FIG. 2. The schedule may be the time and date of transmission of the electronic communication. The time may be the send time determined at block 506, and the date may be based on user input. For example, a user may indicate an intention or desire to send the electronic communication on a particular date, and this date may be utilized to schedule the electronic communication along with the send time that is determined from the predicted open time and click time. In some embodiments, scheduling the electronic communication includes adding the date and time for an electronic communication to a schedule for a plurality of electronic communications, which may have different times and/or dates. The content of the plurality of electronic communications within the schedule may be the same or substantially the same, and the intended recipient of each communication may be different.

In some aspects, the schedule that is generated may be an automatically executing schedule such that the electronic communications within the schedule will be automatically transmitted to their respective recipients at the scheduled time(s) and date(s). In some embodiments, the schedule is set to automatically execute but may be modifiable by a user prior to execution. For example, a user may change the date and/or time for sending an electronic communication or may cancel sending the electronic communication. Alternatively, the schedule generated at block 508 is presented to a user via a user interface on a user device and is not executed until user confirmation or further user input is received.

FIG. 6 depicts a flow diagram to illustrate a method 600 for training a machine learning model to optimize send time for transmitting an electronic communication. Method 600 may be performed, for example, by training engine 320 of FIG. 3. At block 602, training recipient data is received. The training recipient data, which also may be referred to herein as reference recipient data, is similar to the recipient data discussed with reference to method 500 except that it is stored as training data, such as training data 332 in FIG. 3, and is associated with ground truth data, such as an actual open time and an actual click time. The training recipient data may include characteristics about the intended recipient (such as the recipient's ID, job title, category type, or industry) and/or historical information (such as the recipient's past electronic communications received and electronic communication engagement patterns). Further, in some embodiments, the training recipient data includes information about an account or organization to which a recipient belongs. This account information may describe characteristics of the organization and/or identify historical behavior of employees or leads of the organization. For instance, account information may identify a number of employees or the first active hour of the day for the account based on all of the account leads' historical open and click activities. Additional or alternative types of recipient data that may be received as training recipient data at block 602 is described with respect to receiving component 212 of FIG. 2.

At block 604, a machine learning model is utilized to determine a predicted open time and a predicted click time for an electronic communication based at least on the received training recipient data. Embodiments of block 604 may be performed by task predictor 322 of FIG. 3. Additionally, embodiments of block 604 may be performed similarly to block 504 of FIG. 5. As such, a single machine learning model may be used to predict both an open time and a click time for an electronic communication based on the training recipient data that corresponds to a recipient of the electronic communication. In exemplary embodiments, this machine learning model is a neural network. The neural network may have a multi-branch architecture, such as the example neural network architecture 400 of FIG. 4, in which a first branch outputs a predicted open time and a second branch outputs a predicted click time. It is contemplated that other types of machine learning models may be utilized at block 604, such as a random forest model or support vector machine.

At block 606, a loss value is determined based on the predicted open time, the predicted click time, a ground truth open time associated with the training recipient data, and a ground truth click time associated with the training recipient data. In other words, the loss value is computed by comparing the predicted open time and predicted click time to the respective ground truth (actual) times. Embodiments of block 606 may be performed by loss determiner 324 of FIG. 3.

The loss value determined at block 606 may be a joint loss that represents error in predicting both open time and click time. As such, block 606 may include determining the absolute difference between the predicted open time and the actual (ground truth) open time, determining the absolute difference between the predicted click time and the actual (ground truth) click time, and combining these differences. In some embodiments, combining these differences is done using a weighted sum. In some embodiments, the open time loss is weighted more heavily than the click time loss. For instance, the weight of the open time loss may be 0.8, while the weight of the click time loss may be 0.2. In some aspects, the overall loss value determined at block 606 is based on one or more losses (e.g., open time loss and/or click time loss) that is biased in that it is determined utilizing a loss function that penalizes overprediction as described further with respect to method 700 of FIG. 7.

At block 608, the machine learning model, such as a neural network, is adjusted based on the loss value. Embodiments of block 608 may be performed by adjustment component 326 of FIG. 3. The adjustment may include adjusting weights of features or any known manner of adjusting a neural network or other machine learning model for future iterations. The process of predicting open and click times using a machine learning model, determining a loss, and adjusting the machine learning model based on the loss may be continued using training data relating to additional electronic communications until the determined loss is minimized or meets a maximum allowable loss threshold. By using a joint loss to adjust the machine learning model, the model is jointly trained to optimize multiple tasks that each impact optimizing send time to maximize recipient engagement. Through joint training, the machine learning model may be utilized to more accurately determine the optimal send time because these tasks (e.g., open time and click time) are viewed together. Further, by utilizing one model for all tasks, predictions for tasks can be optimized while conserving time and computer memory that would be otherwise be consumed if these tasks were predicted separately.

FIG. 7 depicts a flow diagram to illustrate a method 700 for training a machine learning model to optimize send time for transmitting an electronic communication. Method 700 may be performed, for example, by training engine 320 of FIG. 3. At block 702, training recipient data is received. Embodiments of block 702 may be performed as described with respect to block 602 of FIG. 6.

At block 704, a machine learning model is utilized to determine a predicted open time for an electronic communication based at least on the training recipient data. The machine learning model may be a neural network. Further, embodiments of block 704 may also include predicting a click time for the electronic communication based on the training recipient data. The predicted open time and the predicted click time may be determined within the same pass of the machine learning model. In some embodiments, the open time and click time are predicted contemporaneously through the use of a multi-branch neural network architecture, such as the neural network architecture 400 of FIG. 4. Embodiments of block 704 may be performed as described with respect to block 604 of FIG. 6.

At block 706, a biased loss value is determined based on the predicted open time and a ground truth open time. Embodiments of block 706 may be performed by loss determiner 324 of FIG. 3. The biased loss vale is determined at block 706 utilizing a loss function that penalizes predicting an open time to be a after the ground truth open time (i.e., penalizes overprediction). In exemplary aspects, the biased loss is a modified MAE in which the rules applied to determine the loss depend on whether or not the predicted open time is greater (later) than the actual open time. For example, if the predicted open time determined at block 704 is less than or equal to the actual open time, the loss may be computed as the absolute difference between the actual and predicted times. However, where the predicted open time is later than the actual open time, the absolute difference between the predicted and actual open times is multiplied by a predetermined penalty value.

In embodiments of method 700 in which the machine learning model is utilized to predict multiple tasks, such as an open time and a click time, the biased loss determined for the open time is combined with a loss determined for the click time to determine an overall value. Combining the two losses may be done as described in block 606 of FIG. 6. For example, weights may be applied to the two losses, and the weighted losses may be summed together. In combining the two loss values for open time and click time, the loss value for open time may be the biased loss as described above. In some embodiments, the loss for the click time may not be biased such that it may be the absolute difference between the predicted open time and the actual open time regardless of whether the prediction is later than the actual time. In other embodiments, however, the loss value for the click time may also be a biased loss such that it is determined by applying rules that penalizes overpredicting click time. For example, the click time loss may be computed as the absolute difference between the predicted click time and the actual click time if the predicted click time is earlier than or equal to the actual click time, and if the prediction is later than the actual click time, the click time loss may be computed by multiplying a predetermined penalty value to the absolute difference between the predicted click time and the actual click time. The predetermined penalty value used for a click time biased loss may be the same or may be different than the predetermined penalty value used for open time.

At block 708, the machine learning model, such as a neural network, is adjusted based at least on the biased loss value determined at block 706. Embodiments of block 708 may be performed by adjustment component 326 of FIG. 3. Block 708 may include adjusting weights of features or any known manner of adjusting a neural network or other machine learning model for future iterations. In embodiments in which another task, such as click time, is also predicted and a combined loss is determined at block 706, block 708 includes adjusting the machine learning model based on the combined loss, which includes the biased loss value.

The process of predicting open time (and, in some embodiments, click time) using a machine learning model, determining a biased loss, and adjusting the machine learning model based on the loss may be continued using training data related to additional electronic communications until the determined loss is minimized or meets a maximum allowable loss threshold. By using a biased loss in this manner, the machine learning model is trained to be biased against predicting after the actual open time. In this way, the machine learning model may be less likely to predict after the actual time, which consequently reduces the likelihood of a recipient not opening an electronic communication with time sensitive information until it is too late.

Figure 8:
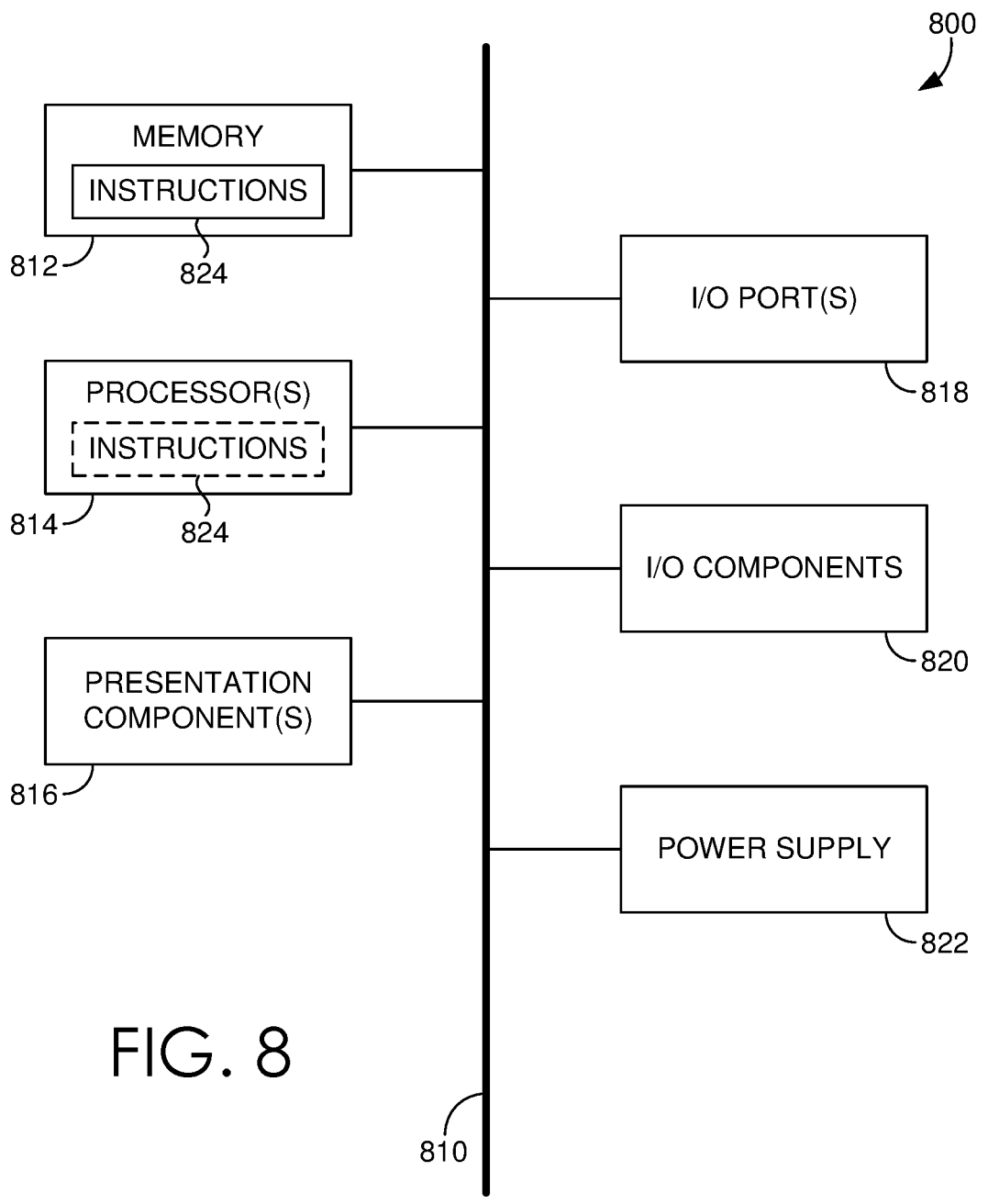
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in
the art that alternate embodiments may be practiced without
the specific details. In other instances, well-known features
have been omitted or simplified in order not to obscure the
illustrative embodiments.

Embodiments presented herein have been described in
relation to particular embodiments which are intended in all
respects to be illustrative rather than restrictive. Alternative
embodiments will become apparent to those of ordinary skill
in the art to which the present disclosure pertains without
departing from its scope.

What is claimed is:

1. A computer-implemented method comprising:
receiving an indication of an electronic communication to
be sent to a recipient, the electronic communication
including a link selectable by the recipient;
based on recipient data for a plurality of recipients includ-
ing the recipient, determining a predicted open time
and a predicted click time of the link selectable by the
recipient included in the electronic communication,
wherein the predicted open time and the predicted click
time are determined from an output of a machine
learning model, the machine learning model including
a neural network with a first branch of the neural
network that outputs predicted open times and a second
branch of the neural network that outputs predicted
click times, wherein the neural network is trained using
a joint loss value based on a click time loss associated
with the predicted click times and an open time loss
associated with the predicted open times, where the
open time loss is weighted more heavily than the click
time loss, wherein the machine learning model is
trained based on a first biased loss value generated
using a first loss function that penalizes predicting open
times later than ground truth open times and a second
biased loss value generated using a second loss func-
tion that penalizes predicting click times later than
ground truth click times;
based on the predicted open time and the predicted click
time, determining a send time for the electronic com-
munication;
based on the send time, generating a schedule for sending
the electronic communication to the recipient; and
causing the electronic communication to be sent to the
recipient based on the schedule.

2. The computer-implemented method of claim 1,
wherein determining the send time for the electronic com-
munication comprises applying one or more predefined rules
to the predicted open time and the predicted click time.

3. The computer-implemented method of claim 1,
wherein determining the send time comprises determining
an earlier of the predicted open time and the predicted click
time and setting the send time to a pre-determined period of
time prior to the earlier of the predicted open time and the
predicted click time.

4. The computer-implemented method of claim 1,
wherein the electronic communication is an e-mail.

5. The computer-implemented method of claim 1,
wherein determining the predicted open time and the pre-
dicted click time comprises determining a plurality of pre-
dicted open times and a plurality of predicted click times
based on recipient data for a plurality of recipients, each
predicted open time and each predicted click time corre-
sponding to a particular recipient; wherein determining the
send time comprises determining a plurality of send times.

6. The computer-implemented method of claim 1,
wherein the recipient data comprises one or more of data identifying characteristics of the recipient, historical elec-
tronic communication data of the recipient, data identifying
characteristics of an organization to which the recipient
belongs, and historical electronic communication data of the
organization.

7. The computer-implemented method of claim 1,
wherein causing the electronic communication to be sent to
the recipient based on the schedule is performed without a
user action.

8. The computer-implemented method of claim 1,
wherein the click time loss value is determined based on the
predicted click time and a ground truth click time indicated
in ground truth data, where a penalty value is applied to a
difference between the predicted click time and the ground
truth click time.

9. The computer-implemented method of claim 1,
wherein the open time loss value is determined based on the
predicted open time and a ground truth open time indicated
in ground truth data, where a penalty value is applied to a
difference between the predicted open time and the ground
truth open time.

10. The computer-implemented method of claim 1,
wherein the joint loss value is determined by at least
combining the click time loss and the open time loss with a
weight value.

11. One or more non-transitory computer storage media
storing computer-readable instructions that, when used by
one or more computing devices, cause the one or more
computing devices to perform operations comprising:
receiving training recipient data associated with a recipi-
ent of an electronic communication, the electronic
communication including a link that is selectable by the
recipient;
utilizing a machine learning model to determine a pre-
dicted open time and a predicted click time associated
with the link within the electronic communication
based on at least the training recipient data, wherein the
machine learning model includes a neural network with
a first branch of the neural network that outputs the
predicted open time and a second branch of the neural
network that outputs the predicted click time;
determining a joint loss value based on a click time loss
associated with the predicted click time and an open
time loss associated with the predicted open time,
where the open time loss is determined based on a first
biased loss function taking as a first input a ground truth
open time corresponding to a first interval of time the
recipient opened the electronic communication indi-
cated in the training recipient data, the first biased loss
function penalizing predicting open times later than
ground truth open times and a second biased loss
function penalizing predicting click times later than
ground truth click times, and the click time loss is
determined based on the second biased loss function
taking as a second input a ground truth click time
corresponding to a second interval of time the recipient
selected the link in the electronic communication,
where the ground truth open time and the ground truth
click time are indicated in the training recipient data;
adjusting the machine learning model based on the joint
loss value;
determining a send time for a second electronic commu-
nication based on a second predicted open time and a
second predicted click time determined by the machine
learning model;
generating a schedule for sending the second electronic
communication based on the send time; and causing the second electronic communication to be sent based on the schedule.

12. The computer storage media of claim 11, wherein the joint loss value is a weighted sum of an open time loss value and a click time loss value, the open time loss value being based on a comparison of the predicted open time and the ground truth open time and the click time loss value being based on a comparison of the predicted click time and the ground truth click time.

13. The computer storage media of claim 12, wherein determining the open time loss value comprises determining whether the predicted open time is greater than the ground truth open time, and based on a determination that the predicted open time is greater than the ground truth open time, applying a penalty value.

14. The computer storage media of claim 11, wherein the joint loss value is determined by at least combining the click time loss and the open time loss with a weight value.

15. A computing system comprising:

a processor;

memory storing instructions;

a data store comprising training recipient data and ground truth data; and a means for training a machine learning model to predict when an electronic communication will be opened by an intended recipient, wherein the machine learning model is trained to bias towards predicting earlier open times, by at least:

utilizing a first branch of the machine learning model, determining a predicted open time based on training recipient data corresponding to the intended recipient;

utilizing a second branch of the machine learning model, determining a predicted click time based on training recipient data corresponding to the intended recipient;

based on the predicted open time and a ground truth open time, determining a biased loss value using a loss function that penalizes predicting open times later than ground truth open times;

based on the predicted click time and a ground truth click time, determining a second biased loss value using a second loss function that penalizes predicting click times later than ground truth click times;

adjusting the machine learning model based on the biased loss value and the second biased loss value;

determining a send time for a second electronic communication based on a second predicted open time and a second predicted click time determined by the machine learning model;

generating a schedule for sending the second electronic communication based on the send time; and causing the second electronic communication to be sent based on the schedule.

16. The computing system of claim 15, wherein the machine learning model comprises a neural network system.

17. The computing system of claim 15, wherein determining the biased loss value comprises determining that the predicted open time is later than the ground truth open time and applying a penalty value to a difference between the predicted open time and the ground truth open time.

18. The computing system of claim 15, wherein the predicted click time indicates when content within the electronic communication will be selected.

19. The computing system of claim 18, wherein the means for training the machine learning model comprises utilizing training recipient data to determine contemporaneously the predicted open time and the predicted click time, and determining a joint loss value by combining the first biased loss value and the second biased loss value.

20. The computing system of claim 19, wherein the click time loss value is determined based on the predicted click time and a ground truth click time indicated in the ground truth data.

* * * * *